United States Patent [19]

Fukami et al.

[11] Patent Number: 4,556,171
[45] Date of Patent: Dec. 3, 1985

[54] HEATING SYSTEM FOR AUTOMOBILES WITH HEAT STORAGE TANK

[75] Inventors: Akira Fukami, Okazaki; Hiroki Noguchi, Oobu, Yauo Kondo, Okazaki, all of Japan

[73] Assignee: Nippon Soken, Inc., Nishio, Japan

[21] Appl. No.: 359,090

[22] Filed: Mar. 17, 1982

Related U.S. Application Data

[62] Division of Ser. No. 296,252, Aug. 26, 1981.

[30] Foreign Application Priority Data

Nov. 26, 1980 [JP] Japan .............................. 55-166429
Nov. 26, 1980 [JP] Japan .............................. 55-166430

[51] Int. Cl.⁴ ...................... B60H 1/02; F24D 11/00; F01P 11/02; F02N 17/02
[52] U.S. Cl. .................... 237/12.3 B; 237/44; 123/41.14; 123/142.5 R; 137/590; 165/104.19; 165/43
[58] Field of Search ...................... 237/12.3 A, 12.3 B, 237/44, 75; 165/42, DIG. 10, 104.19; 98/20 S; 123/41.14, 142.5 R; 126/437; 137/564.5, 590; 138/39

[56] References Cited

U.S. PATENT DOCUMENTS

| | | | |
|---|---|---|---|
| 2,132,961 | 10/1938 | Morgan | 138/39 |
| 3,123,900 | 3/1964 | Millar | 138/39 |
| 3,498,539 | 3/1970 | Boehmfeld et al. | 237/12.3 B |
| 3,521,704 | 7/1970 | Bridegum | 237/12.3 B |
| 3,733,898 | 5/1973 | Yamamoto et al. | 138/39 |
| 3,758,031 | 9/1973 | Moran | 237/12.3 C |
| 3,853,270 | 12/1974 | Prebil | 237/12.3 B |
| 4,210,175 | 1/1980 | Daniels et al. | 137/564.5 |

FOREIGN PATENT DOCUMENTS

| | | | |
|---|---|---|---|
| 1130673 | 8/1982 | Canada | 165/104.19 |
| 0114140 | 10/1978 | Japan | 237/12.3 B |

*Primary Examiner*—William R. Cline
*Assistant Examiner*—John K. Ford
*Attorney, Agent, or Firm*—Cushman, Darby & Cushman

[57] ABSTRACT

A heating system for automobiles utilizing the hot water from the engine cooling system as a heat source includes a heating radiator and a heat accumulating water tank, and pipe lines are provided between the engine cooling system, heating radiator and heat accumulating water tank. The flow passages of the cooling water through the pipe lines are switched by electromagnetic valves provided in the pipe lines so that the heating radiator and the heat accumulating water tank are connected in series or in parallel with each other with respect to the engine cooling system, or a circulating passage is formed between the heating radiator and the heat accumulating water tank. The heat accumulating water tank has a mixing preventing device to prevent cold cooling water flowing into the water tank from mixing with hot water contained in the water tank.

2 Claims, 8 Drawing Figures

HEATING SYSTEM FOR AUTOMOBILES WITH HEAT STORAGE TANK

This is a division of application Ser. No. 296,252 filed Aug. 26, 1981.

BACKGROUND OF THE INVENTION

The present invention relates to heating systems for automobiles and more particularly to a hot-water type heating system which includes a radiator and a heat accumulating water tank and utilizes the cooling water of an engine as a heat source.

In the past, water-cooled engine equipped automobiles have been provided with heating systems of the hot-water type which utilize the cooling water of the water-cooled engine as a heat source to heat the interior of the vehicle compartment. This type of heating system is disadvantageous in that during the period immediately following the engine starting, the temperature of the engine cooling water is so low that the heating effect required by the vehicle occupants cannot be obtained and the driver is compelled to drive the vehicle under very cold conditions.

Conventional hot-water type heating systems of the type including a regenerative water tank in addition to the radiator are disclosed, for example, in Japanese Laid-Open Patent Publication No. 53-114140. This type of heating system further includes a heat accumulating water tank as a means of overcoming the situation in which just after the starting of the engine under winter conditions the engine cooling water temperature is so low that the heating effect required by the vehicle occupants cannot be provided by the radiator alone. Thus the high-temperature cooling water produced during the engine operation is stored and kept warm in the heat accumulating water tank so that during the period just after the engine starting where the cooling water temperature is low, the stored high-temperature water is introduced into the heating radiator and the heat energy of the high-temperature cooling water is taken out as hot air, thus providing the desired heating effect from the time just following the start of the engine operation. This type of heating system is also disadvantageous. This is so because while the desired pipe lines, electromagnetic valve and electrically-operated water pump are provided to circulate the engine cooling water only between the radiator and the heat accumulating water tank, and the temperature of the cooling water in the engine section is sensed by a water temperature sensor such that when the cooling water temperature is high the radiator and the heat accumulating water tank are connected in parallel with the engine cooling water outlet and inlet to circulate the cooling water in parallel with the radiator and the heat accumulating water tank, if the cooling water temperature is low only the stored water in the heat accumulating water tank is circulated only through the radiator and the heat accumulating water tank and no cooling water from the engine section flows via either one or both of the radiator and the heat accumulating water tank.

As a result, when the hot water in the heat accumulating water tank is delivered to the heating radiator through one of the circulating water passages between the radiator, and the heat accumulating water tank just after the start of the engine, the cold water in the radiator, which is as low as the outside air, flows into the heat accumulating water tank. Thereafter, the hot water, which was used for heating purposes and cooled, also flows into the heat accumulating water tank. As a result, even when hot water of a sufficient temperature for heating purposes is stored in the heat accumulating water tank, the temperature of the hot water will be decreased rapidly in a short period of time by the cold water flowing into the heat accumulating water tank after an actuation of the system, thus failing to provide the satisfactory heating effect.

Moreover, the heat accumulating water tank as well as the piping, electromagnetic valve, electrically operated pump, etc., in the circulating passages provided between the heat accumulating water tank and the radiator are used solely for providing heating for the vehicle occupants during the period immediately following the starting of the engine under winter conditions. No consideration is given to the problem of a warming up operation which must also be considered when starting the engine under winter conditions.

SUMMARY OF THE INVENTION

With a view to overcoming the foregoing deficiencies in the prior art, it is an object of the present invention to provide an improved heating system for automobiles which is capable of effectively utilizing the hot water in a heat accumulating water tank so as to ensure a satisfactory heating effect as soon as the engine is started.

It is another object of the present invention to provide a multi-function heating system for automobiles including a radiator and a heat accumulating water tank that is capable not only of providing for interior heating but also of serving a warming up function as well as an engine overheating preventive function under summer conditions.

In accordance with the present invention there is provided a hot-water type heating system for automobiles comprising a heating radiator and a heat accumulating water tank which are connected between the cooling water outlet and inlet of an engine, a device for selectively introducing the engine cooling water from the engine and the heat accumulating water tank into the heating radiator and a mixing preventive device disposed in the heat accumulating water tank for preventing mixing of the cold water and the hot water.

Thus, in accordance with one phase of the present invention there is a great advantage in that the device for preventing mixing of the cold water with the hot water is disposed within the heat accumulating water tank such that the high-temperature cooling water kept hot within the heat accumulating water tank can be effectively utilized for vehicle interior heating purposes by the action of the mixing preventive device. Thus a satisfactory heating effect can be provided as soon as the engine is started.

In accordance with another aspect of the invention, a cooling water passage for passing the cooling water in series through the heating radiator and the heat accumulating water tank, a cooling water passage for passing the cooling water only through the heating radiator and a cooling water passage for passing the cooling water only through the heat accumulating water tank are provided between the cooling water outlet for circulating the engine cooling water through the main radiator and the cooling water inlet for introducing the cooling water from the main radiator into the engine means of the cooling water circulating pump, and the opening and closing of the electromagnetic valves associated with the cooling water passages are controlled. In this way, during the period just following the starting of the engine under winter conditions, the heating radiator and the heat accumulating water tank are connected in series whereby the low-temperature cooling water supplied under pressure via the engine cooling water outlet forces the hot water kept hot within the heat accumulating water tank to flow outside so that the hot water passes through the heating radiator to effect the desired heating and then the hot water circulates into the engine to facilitate the warming up of the engine. Further, after the engine has warmed up, the heating radiator and the heat accumulating water tank are connected in parallel with each other so that the radiator is enabled to ensure a satisfactory heating effect by virtue of the cooling water from the engine which has risen in temperature sufficiently and also the hot water is stored and kept hot within the heat accumulating water tank in preparation for the next starting of the engine.

In accordance with still another aspect of the invention, there are provided a water temperature sensor for sensing the temperature of the engine cooling water, a water temperature sensor for sensing the temperature of the cooling water (or the hot water) within the heat accumulating water tank and an air temperature sensor for sensing the temperature of the outside air. Thus, in accordance with the sensed temperatures and in response to the closing and opening of a heating switch, the desired heating and warming up conditions, the necessity for engine overheating preventive measures or the like are determined. Thus during the period immediately following the starting of the engine under winter conditions, cooling water passages are provided so as to respectively connect the radiator and the heat accumulating water tank in series with the engine cooling water outlet and inlet, and in response to the detection of completion of the warming up period cooling water passages are provided so as to connect the radiator and the heat accumulating water tank in parallel with each other. On the other hand, under engine operating conditions in spring and autumn where no heating is required, a cooling water passage is provided so that only the heat accumulating water tank is connected to the cooling water outlet and inlet irrespective of whether the engine cooling water temperature is lower or higher than the temperature of the water in the heat accumulating water tank. Under summer engine operating conditions, so far as the engine cooling temperature is normal (i.e., lower than the engine overheating temperature), a cooling water passage is provided such that only the regenerative water tank is connected to the cooling water outlet and inlet when the engine cooling water temperature is lower than the water temperature in the heat accumulating water temperature. At the same time the heat accumulating water tank is disconnected from the cooling water outlet and inlet when the engine cooling water temperature is higher than the water temperature in the heat accumulating water tank. When the engine cooling water temperature is higher than the normal temperature and the engine is overheated, only a cooling water passage is provided so that only the heat accumulating water tank is connected to the cooling water outlet and inlet only when the engine cooling water temperature is higher than the water temperature in the heat accumulating water tank.

DETAILED DESCRIPTION OF THE PREFERRED EMBODIMENTS

The present invention will now be described in greater detail with reference to the illustrated embodiments.

Figure 1:
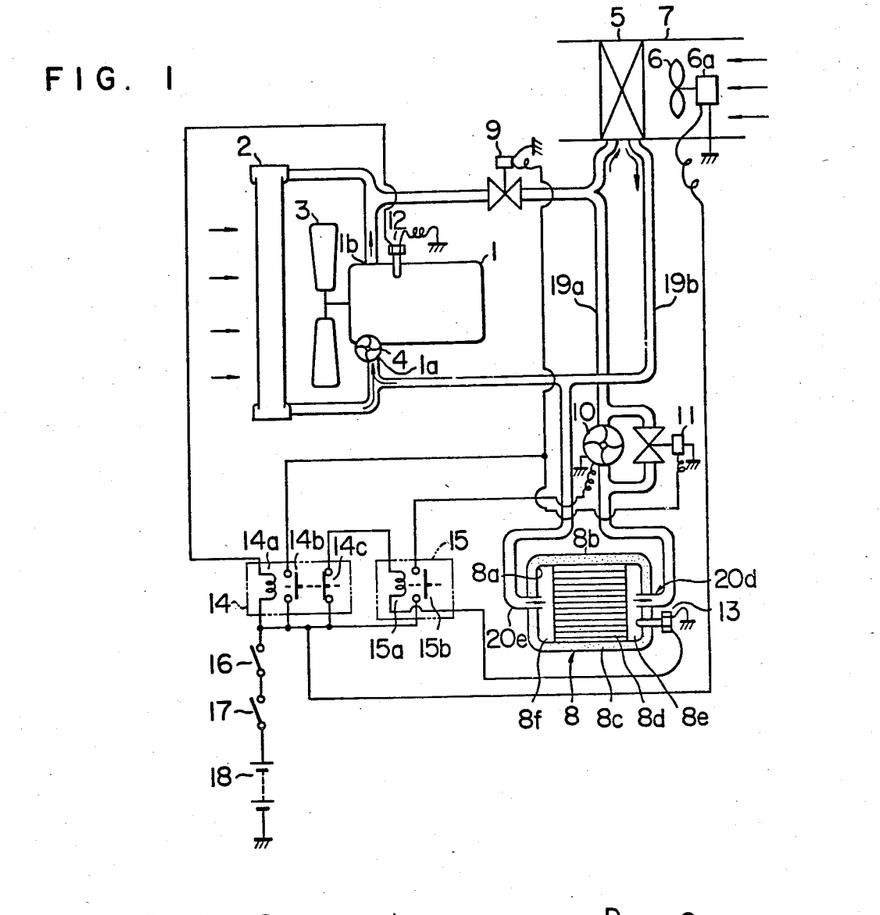
FIG. 1 is a diagram showing an embodiment of a heating system for automobiles according to the present invention.
Figure 2:
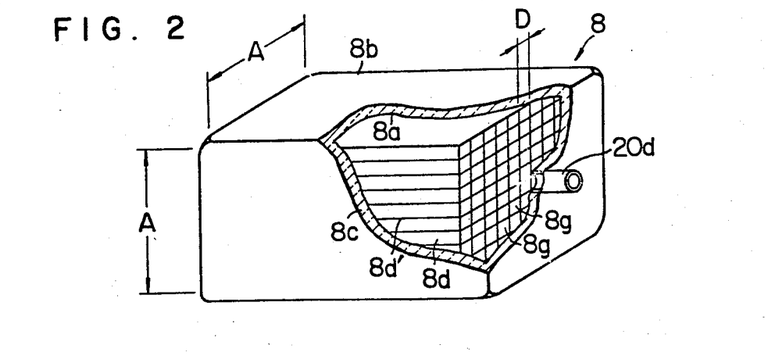
FIG. 2 is a diagram showing the internal construction of the heat accumulating water tank shown in FIG. 1.

Referring to FIGS. 1 and 2 showing a first embodiment of the invention, numeral 1 designates a water-cooled engine of an automobile, 2 a radiator for cooling the cooling water of the engine 1, and 3 a radiator cooling fan driven from the engine 1. Numeral 4 designates an engine cooling water circulating water pump which is provided on the cooling water inlet side of the engine 1 and is also driven from the engine 1. Numeral 5 designates a heating radiator of a hot-water type heating system utilizing the engine cooling water as a source of heat, and 6 a heating fan which supplies air to the radiator 5 and is driven by an electric motor 6a. Numeral 7 designates a case for a heating system which accommodates the radiator 5, the fan 6, etc., and is usually installed below the instrument panel in the vehicle compartment. The air outlets of the radiator 5 are directed toward the feet of the vehicle occupants. Numeral 8 designates a heat accumulating water tank comprising a pair of metal or resin cases 8a and 8b and a heat insulating layer 8c provided between the inner and outer cases 8a and 8b to thereby minimize the dissipation of heat to the outside. The heat accumulating water tank 8 is installed, for example, at a place near the case 7 for the heating system within the vehicle compartment.

The heating radiator 5 and the heat accumulating water tank 8 are connected by pipe lines in parallel between a cooling water inlet 1a and a cooling water outlet 1b of the engine 1. Numeral 9 designates an electromagnetic valve disposed in a cooling water circulating passage including the heating radiator 5 and the engine 1. Numerals 10 and 11 designate an electrically-operated pump and an electromagnetic valve which are disposed in parallel in a cooling water circulating passage including the heat accumulating water tank 8 and the heating radiator 5.

Numeral 12 designates a first temperature sensor mounted on the water jacket of the engine 1 to sense the temperature of the cooling water in the engine section. The sensor 12 adapted to be closed when the cooling water temperature becomes higher than a preset temperature of 45° C., for example. Numeral 13 designates a second temperature sensor which senses the cooling water temperature within the heat accumulating water tank 8 and is closed when the cooling water temperature exceeds a preset temperature, for example, 45° C. Each of the first and second temperature sensors 12 and 13 comprises, for example, a bimetal switch or a reed switch which is opened and closed in response to the magnetic transformation point of thermoferrite. Numeral 14 designates a relay controlled by the first temperature sensor 12 and comprising an excitation coil 14a, a normally open contact 14b and a normally closed contact 14c. Numeral 15 designates a relay controlled by the second temperature sensor 13 and comprising an excitation coil 15a and a normally open contact 15b. Numeral 16 designates a manually operated heating switch, 17 an engine key switch, and 18 a vehicle-mounted power supply battery. Numerals 19a and 19b designate pipe lines between the radiator 5 and the heat accumulating water tank 8.

In accordance with the present invention, the heat accumulating water tank 8 incorporates therein a mixing preventive device for preventing mixing of the cold water and the hot water. In the present embodiment, the device comprises a honey-comb flow reactifying device 8d composed of sheets 8d' of aluminum or the like as shown in FIG. 2. The honey-comb flow rectifying device 8d is so designed that the resistance due to the water flow from an inlet area 8f to an outlet area 8e is insignificant. Also, while, in the case of FIG. 2, its flow paths 8g have a square shape in cross section, the device may be of a honey-comb shape which is triangular or hexagonal in cross section. The thickness of the sheets 8d' should preferably be as thin as possible. Further, the length D of each side of each path 8g (or possibly the hydraulic diameter D') is selected so that the Reynolds number of the water flow through the paths 8g becomes 10 to 20 for the reasons that will be described later. Thus, the value of D is determined in accordance with the following relations using the arbitrarily given values of Q and $A_2$ $$U = Q/A^2$$

where
  U = flow velocity of water, m/sec
  Q = flow rate of water, m³/sec
  $A^2$ = total path cross-sectional area of heat accumulating water tank $$Re = (U \cdot D)/\nu$$

where
  Re = Reynolds number
  $\nu$ = dynamic coefficiency of viscosity of water
For example, if the following is selected $$Q = 1 \text{ l/min} = 1.67 \times 10^{-5} \text{ m}^3/\text{sec}$$

$$A^2 = 15 \text{ cm} \times 15 \text{ cm} = 2.25 \times 10^{-2} \text{ m}^2$$

$$\nu = 0.5 \times 10^{-6} \text{ m}^2/\text{sec}$$

then we obtain $D < 1.3 \times 10^{-2}$ m = 13 mm. In other words, if the values of Q and $A^2$ are given as mentioned above, then it is only necessary to select the value of D about 10 mm.

On the other hand, the capacities of the areas 8e and 8f must be selected as small as possible. Numeral 20d designates an outlet pipe, and 20e an inlet pipe.

Next, the operation of the first embodiment will be described. The engine key switch 17 is closed first and the engine 1 is started. Then, the heating switch 16 is closed. At this time, the heat accumulating water tank 8 is holding therein the cooling water heated to a high temperature (e.g., 80° C.) by the preceding engine operation, so that the sensed temperature of the second temperature sensor 13 is higher than the preset temperature and thus the sensor 13 is closed. As a result, the closing of the heating switch 16 energizes the excitation coil 15a of the relay 15 and the normally open contact 15b is closed. When this occurs, the electrically-operated pump 10 is energized and it starts operating. Simultaneously, the heating fan 6 is also energized and it starts operating. On the other hand, during the period just following the starting of the engine 1, the temperature of the cooling water in the engine section is low so that the first temperature sensor 12 is not operated and the relay 14 is also not operated. As a result, the electromagnetic valves 9 and 11 are not energized and the valves 9 and 11 are kept closed. Thus, the low-temperature cooling water from the engine section does not flow into the heating radiator 5 and only the high-temperature cooling water in the heat accumulating water tank 8 is circulated via the heating radiator 5 by the action of the electrically-operated pump 10. In the heating radiator 5, the exchange of heat occurs between the high-temperature cooling water and the air fed by the heating fan 6 so that the supplied air is heated and it becomes hot air. This hot air is blown from the air outlets (not shown) of the case 7 toward the feet of the vehicle occupants to serve the purpose of heating the interior of the vehicle compartment.

On the other hand, the cold water in the pipe lines 19a and 19b and the heating radiator 5 is introduced into the inlet area 8f via the inlet pipe 20e. Since the flow path resistance to the water passing through the flow rectifying device 8d is slightly greater than that of the inlet area 8f, the introduced cold water flows into the rectifying device 8d relatively uniformly. While, prior to the introduction into the rectifying device 8d, the entering cold water mixes with the hot water which has been kept hot in the inlet area 8f, by reducing the capacity of the inlet area 8f, it is possible to correspondingly reduce the loss of the hot water due to the mixing. The cold water entering the rectifying device 8d moves forward while successively forcing out the hot water. In the case of a laminar flow having the Reynolds number of about 10 to 20, the flow is very slow and it does not involve the occurrence of any disturbance or eddy. As a result, practically no mixing takes place at the boundary surface between the cold water and the hot water and practically no loss of the hot water occurs.

In the manner described above, a full utilization of the hot water stored in all parts of the heat accumulating water tank 8 is ensured by the action of the flow rectifying device 8d and practically no mixing of the cold water and the hot water takes place. Thus, practically there is no loss of the hot water and the energy of the hot water in the heat accumulating water tank 8 can thus be utilized effectively for heating purposes. By the time that the cold water reaches the outlet, the warming up of the engine 1 proceeds so that the cooling water temperature in the engine section rises to the preset temperature and the first temperature sensor 12 is closed. When this occurs, the excitation coil 14a of the relay 14 is energized so that the normally open contact 14b is closed and the normally closed contact 14c is opened. As a result, the electromagnetic valves 9 and 11 are both energized and opened and simultaneously the normally open contact 15b of the relay 15 is returned to the open condition thus stopping the operation of the electrically-operated pump 10. Thus, thereafter the cooling water heated by the engine 1 is circulated through the heating radiator 5 by the action of the water pump 4 and the interior heating of the vehicle compartment is accomplished. At the same time, the cooling water in the engine section is introduced into the heat accumulating water tank 8 via the electromagnetic valve 11 and through the outlet pipe 20d and it is circulated through the heat accumulating water tank 8, thus replacing the low-temperature cooling water with the high-temperature cooling water and preparing for the heating immediately after the next starting of the engine 1.

Figure 3:
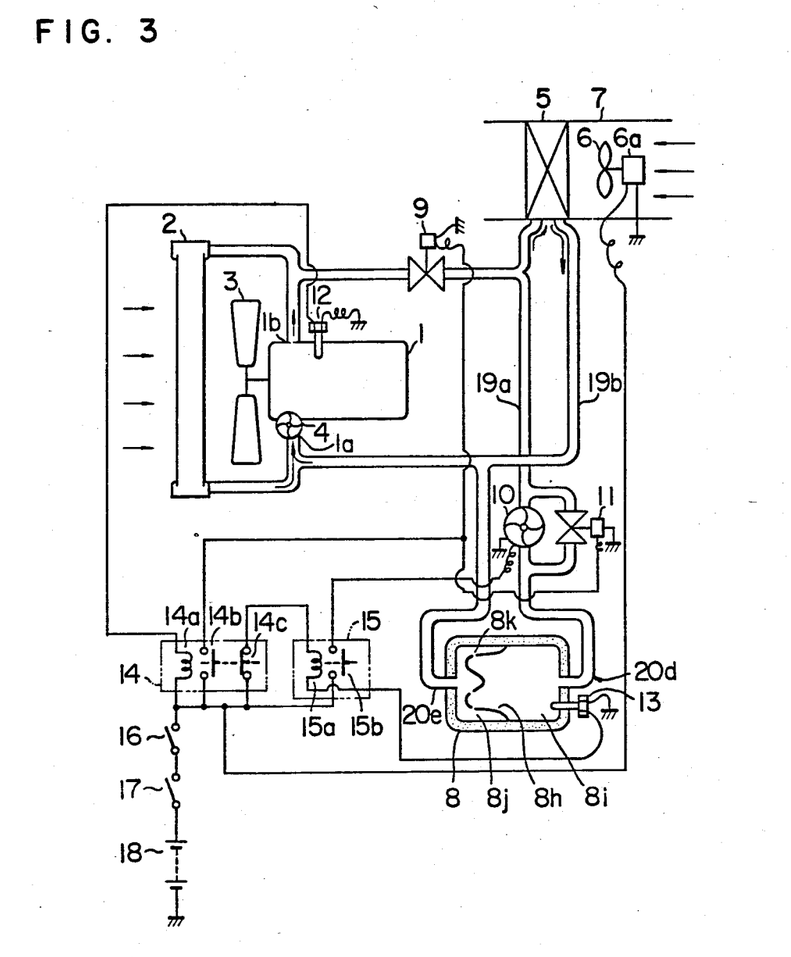
FIG. 3 is a diagram showing another embodiment of the invention.

FIG. 3 illustrates a second embodiment of the invention which differs from the first embodiment in that the mixing preventive device disposed within the heat accumulating water tank 8 comprises a deformable separating diaphragm 8h having a plurality of small holes 8k. The diaphragm 8h is made from an easily deformable material such as a vinyl sheet and it separates a hot water occupying room 8i and a cold water occupying room 8j from each other. Also, the diaphragm 8h is easily deformable in dependence on the amounts of the cold and hot water and the difference between the pressures. Thus, when the pressure in the hot water occupying room 8i is greater than that in the cold water occupying room 8j, the diaphragm 8h deforms such that the cold water occupying room 8j is reduced practically to zero or the diaphragm 8h is closely contacted with the left end. When the pressure in the hot water occupying room 8i is smaller than that in the cold water occupying room 8j, the diaphragm 8h is deformed such that the hot water occupying room 8i is practically reduced to zero or the diaphragm 8h is brought into close contact with the right end. The plurality of small holes 8k in the diaphragm 8h are so formed that the flow path area of the outlet pipe 20d becomes several times the sum total of the areas of the small holes 8k.

In accordance with this embodiment, if the heating operation is performed during the period just following the start of the engine 1 where the cooling water temperature in the engine section is low, the cold water in the pipe lines 19a and 19b and the heating radiator 5 is introduced into the cold water area 8j via the inlet pipe 20e. However, the diaphragm 8h separates the hot water from the cold water and they are prevented from mixing. Although the presence of the small holes 8k permits a part of the cold water to enter the hot water area 8i, the amount of the cold water entering during the operating time of the system (several minutes) is relatively small and thus there is practically no loss of the hot water. In this way, the action of the diaphragm 8h prevents mixing of the cold and hot water and the effective utilization of the hot water is accomplished. By the time that the amount of the hot water in the hot water area 8i is reduced to about zero, the warming up of the engine 1 proceeds so that the cooling water heated by the engine 1 is circulated through the heating radiator 5 by the action of the water pump 4 and the interior heating of the vehicle compartment is effected. At the same time, the cooling water in the engine section is introduced into the hot water area 8i of the heat accumulating water tank 8 via the electromagnetic valve 11 so that the cold water in the cold water area 8j is forced out and the heat accumulating water tank 8 is filled with the hot water.

However, since the hot water just after the engine warming up has not risen as high as 80° C., the temperature of the hot water initially stored in the regenerative water tank 8 is about 60° C. Then, as the engine warming up proceeds further so that the cooling water temperature reaches 80° C., the hot water in the tank 8 is gradually replaced with the hot water of 80° C. through the small holes 8k, thus preparing for the next immediate post-engine-start heating.

Figure 4:
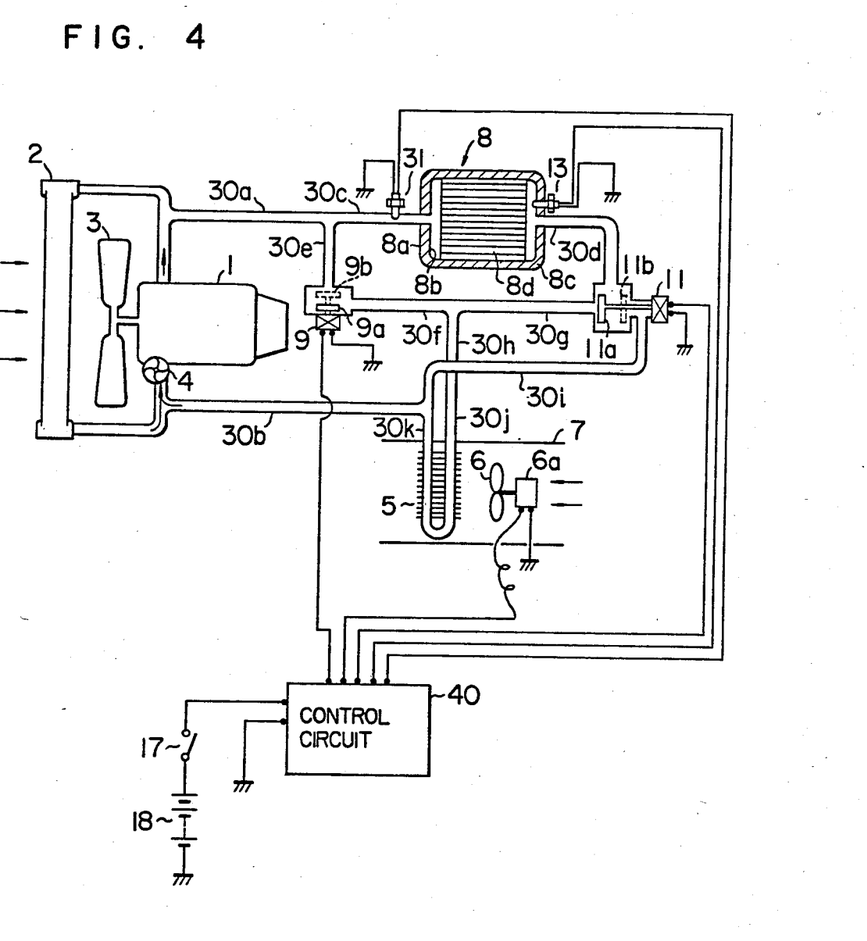
FIG. 4 is a diagram showing still another embodiment of the invention.

FIG. 4 shows a third embodiment of the present invention. The third embodiment will now be described mainly with respect to the differences from the first and second embodiments.

The cooling water passages provided for the radiator 5 and the heat accumulating water tank 8 include a passage which connects the radiator 5 and the heat accumulating water tank 8 in series between the engine cooling water outlet (or a cooling water delivery pipe line 30a) and the engine cooling water inlet (or a cooling water inlet pipe line 30b). In this arrangement the cooling water is introduced through a pipe line 30c, the heat accumulating water tank 8, pipe lines 30g, 30h and 30j, the radiator 5 and a pipe line 30k into the engine cooling water inlet (the pipe line 30b) and then drawn into the engine 1 by the water pump 4. Also included is a passage for the cooling water flowing from the engine cooling water outlet (the pipe line 30a) to the engine cooling water inlet (the pipe line 30b) via pipe lines 30e and 30f, the pipe lines 30h and 30j, the radiator 5 and the pipe line 30k thus passing only through the radiator 5. Further included is a passage for the cooling water flowing via the pipe lines 30a and 30c and the heat accumulating water tank 8 and returning to the pipe line 30b through pipe lines 30d and 30i thus passing only the heat accumulating water tank 8. In other words, contrary to the cooling water passage connecting the radiator 5 and the heat accumulating water tank 8, the cooling water passage passing only the radiator 5 branches off the engine cooling water outlet (the cooling water delivery pipe line 30a), enters the pipe line 30e, passes through the electromagnetic on-off valve 9, joins together the pipe lines 30f and 30g at the entry side of the radiator 5 and then enters the pipe line 30h. The cooling water passage passing only the heat accumulating water tank 8 branches off the pipe line 30d at the outlet of the heat accumulating tank 8 via the electromagnetic selector valve 11, enters the pipe line 30i, joins together the pipe lines 30i and 30k at the outlet side of the radiator 5 and then meets the engine cooling water inlet (the cooling water inlet pipe line 30b).

While each of the three cooling water passages may be provided with a separate valve for opening and closing the water passage, in the embodiment of FIG. 4 the cooling water passage passing only the radiator 5 includes the electromagnetic on-off valve 9 disposed on the pipe line 30e branching off the cooling water delivery pipe line 30a. In order to open and close the cooling water passage connecting the radiator 5 and the heat accumulating water tank 8 in series and the cooling water passage passing only the heat accumulating water tank 8, the electromagnetic selector valve 11 is positioned at the bifurcation point of the pipe line 30d at the outlet of the heat accumulating water tank 8 where the two cooling water passages branch off (or divide into the two pipe lines 30g and 30i). The electromagnetic selector valve 11 operates so that one of the branched passages is opened and the other passage is closed.

On the other hand, an inflow water temperature sensor 31 comprising a thermistor or the like is positioned between the engine cooling water outlet (the pipe line 30a) and the inlet of the heat accumulating water tank 8 to sense the temperature of the cooling water entering the heat accumulating tank 8. An outflow water temperature sensor 13 comprising a thermistor or the like is disposed at the outlet of the heat accumulating water tank 8 to sense the temperature of the cooling water delivered from the heat accumulating water tank 8. A control circuit 40 compares the sensed temperatures of the inflow water temperature sensor 31 and the outflow water temperature sensor 13 to send control signals to the electromagnetic on-off valve 9 and the electromagnetic selector valve 11.

Figure 5:
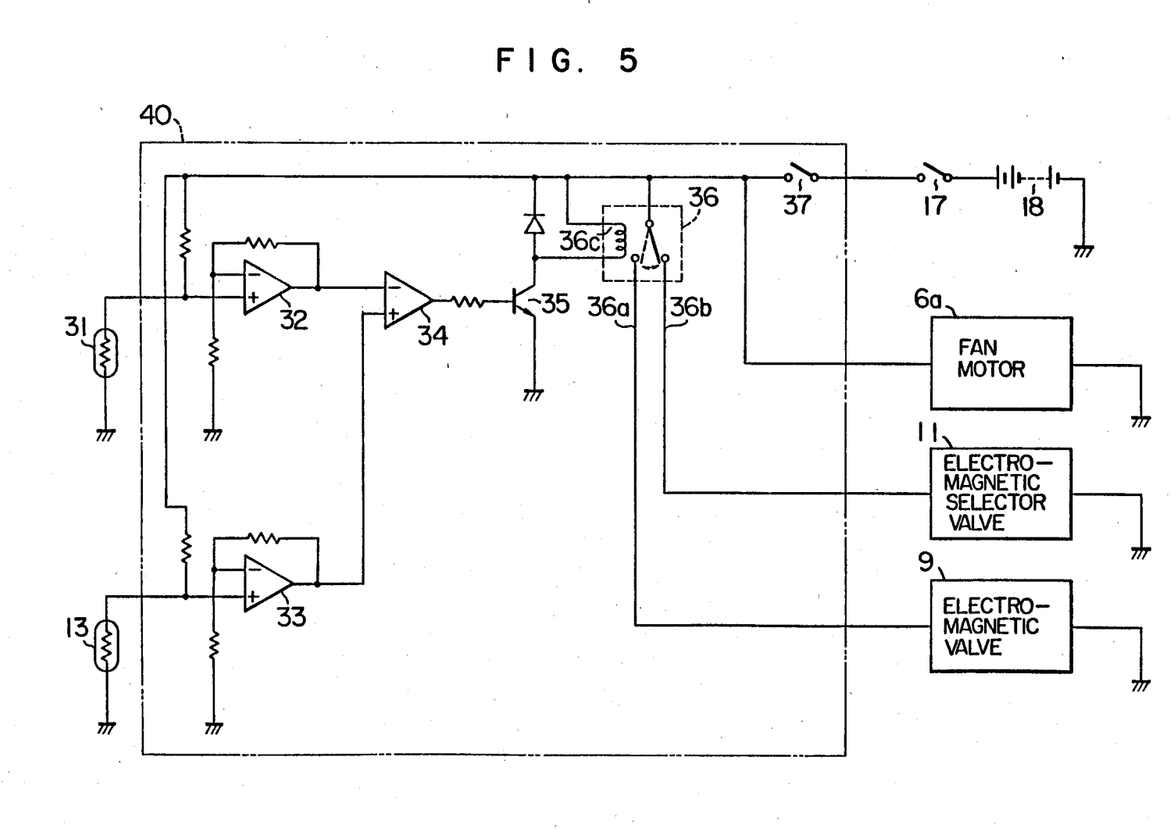
FIG. 5 is a circuit diagram of the control circuit shown in FIG. 4.

FIG. 5 is a circuit diagram of the control circuit 40 comprising amplifiers 32 and 33 for respectively amplifying the detection signals of the inflow water temperature sensor 31 and the outflow water temperature sensor 13, a comparator 34 for comparing the amplified signals, a relay 36 and a transistor 35 responsive to the output of the comparator 34 to operate the relay 36. The relay 36 comprises a coil 36c and contacts 36a, 36b which are respectively turned on and off in response to the presence and absence of current flow in the coil 36c to respectively energize the electromagnetic on-off valve 9 and the electromagnetic selector valve 11. The power from the power source 18 is supplied to the control circuit 40 when the engine key switch 17 and the heating switch 37 are closed.

The operation of the third embodiment will now be described with reference to FIGS. 4 and 5. The engine key switch 17 is closed first to start the engine 1. Then, the heating switch 37 is closed and the power is supplied to the control circuit 40. At this time, the regenerative water tank 8 is storing the high-temperature cooling water heated by the preceding engine operation (e.g., the hot water of 80° C. was stored just after the stopping of the preceding engine operation and the hot water was kept hot so that its temperature would be as high as about 70° C. even after 24 hours). During the period just following the starting of the engine 1, the cooling water within the engine 1 and the cooling water in the pipe lines, including the pipe lines 30a and 30c, are low in temperature, so that the inflow water temperature sensor or thermistor 31 at the inlet of the heat accumulating water tank 8 senses the low temperature and the outflow water temperature sensor or thermistor 13 at the outlet of the heat accumulating water tank 8 senses the high temperature. These detection signals are respectively amplified by the amplifiers 32 and 33 (FIG. 5) and then are applied to the first and second inputs of the comparator 34 (the amplifiers 32 and 33 have the same amplification characteristics and they generate the same signal voltage when the water sensors 31 and 13 sense the same temperature). The thermistor has a negative resistance-temperature characteristic and thus it applies to the comparator 34 a signal voltage which increases with a decrease in the water temperature. The comparator 34 compares the first and second input signals so that a "1" is generated when the first signal voltage is lower than the second signal voltage and a "0" is generated when the reverse is the case. In this case, the signal voltage from the thermistor 31 is higher than the signal voltage from the thermistor 13 and the comparator 34 generates a "0". As a result, the transistor 35 is turned off so that no current flows to the coil 36c of the relay 36 and the current flows from the power source 18 to the contact 36b. Thus, the electromagnetic selector valve 11 connected to the contact 36b of the relay 36 is energized. Since the valve member of the electromagnetic selector valve 11 is at a position 11b (FIG. 4) in the energized condition and at a position 11a in the deenergized condition, in this case the valve member is moved to the position 11b so that the branch pipe line 30g leading from the outlet pipe line 30d of the heat accumulating water tank 8 to the inlet of the radiator 5 is opened and the other branch pipe line 30i bypassing the radiator 5 is closed. On the other hand, the contact 36a of the relay 36 is not energized and thus the electromagnetic valve 9 is not energized. Since the valve member of the electromagnetic valve 9 is at an open position 9a in the energized condition and the valve member is at a closed position 9b in the deenergized condition, in this case the electromagnetic valve 9 is moved to the closed position and thus the water passage leading from the engine cooling water outlet (the pipe line 30a) to the inlet of the radiator 5 is closed. As a result, the low-temperature cooling water is supplied under pressure by the engine cooling water pump 4 from the cooling water outlet (the pipe line 30a) into the heat accumulating water tank 8 via the pipe line 30c. By virtue of the mixing preventive device 8d, the high-temperature hot water stored in the heat accumulating water tank 8 is forced out practically without being mixed with the entering low-temperature cooling water and the hot water is introduced into the radiator 5 via the pipe line 30d, the electromagnetic selector valve 11 and the pipe lines 30g, 30h and 30j. Since the closing of the heating switch 37 has brought the motor 6a into operation thus operating the fan 6, the exchange of heat takes place in the radiator 5 and the hot air is supplied into the interior of the vehicle compartment. In other words, the interior heating is provided immediately after the starting of the engine 1. As a result of the heat exchange, the hot water which was kept hot at a temperature of for example about 70° C. within the heat accumulating water tank 8 is now cooled to about 50° C. and then it is fed back into the engine 1 through the radiator 5 and through the pipe lines 30k and 30b. Since the engine cooling water temperature is about the same with the outside air temperature just after the start of the engine, to supply the hot water of 50° C. under winter conditions has the effect of raising the temperature of the engine cooling water in a short period of time with the result that the warming up operation is completed in several minutes and the time required for warming up is reduced considerably.

About by this time, the hot water in the heat accumulating water tank 8 is used up so that the cold water which was introduced just after the starting of the engine now reaches the outlet of the heat accumulating water tank 8 and the cooling water raised in temperature during the warm up operation of the engine now reaches near the inlet of the heat accumulating water tank 8. As a result, the inflow water temperature sensor 31 senses the high temperature and the outflow water temperature sensor 13 senses the low temperature. Thus, the output of the comparator 34 in the control circuit 40 goes to "1", so that the transistor 35 is turned on and the current flows to the coil 36c of the relay 36 thus supplying the current from the power source 18 to the contact 36a. When this occurs, the electromagnetic on-off valve 9 is energized and the electromagnetic selector valve 11 is deenergized. The energization of the electromagnetic on-off valve 9 moves its valve member to the position 9a thus opening the water passage leading from the pipe line 30e to the pipe line 30f, and the deenergization of the electromagnetic selector valve 11 moves its valve member to the position 11a with the result that the water passage leading from the pipe line 30d to the branch line 30g is closed and the water passage leading to the other branch line 30i is opened. As a result, the hot water forced out from the engine 1 is supplied to the radiator 5 through the pipe lines 30a and 30e, the electromagnetic on-off valve 9 and the pipe lines 30f, 30h and 30j, performs the heating function and is then returned to the engine 1 via the pipe lines 30k and 30b. Also, the hot water forced out from the engine 1 is supplied to the heat accumulating water tank 8 via the pipe lines 30a and 30c so that the cold water in the tank 8 is forced out and returned to the engine 1 via the pipe lines 30i and 30b. As a result, the cold water in the heat accumulating water tank 8 is gradually replaced with the hot water so that after a short time the tank 8 is filled with the high-temperature hot water (e.g., 80° C.) and preparations are completed for the next engine starting. It should be noted here that when these conditions have been attained so that both the cooling water in the engine 1 and the cooling water in the heat accumulating water tank 8 are replaced with the high-temperature hot water (e.g., 80° C.), there is the danger of a situation arising in which slight changes in temperature between the two causes the inflow water temperature sensor 31 to sense repeatedly a lower or higher temperature than the outflow water temperature sensor 13. In these conditions, however, practically the same effect will be obtained from the standpoint of giving full play to the heating efficiency and no trouble will be caused even if the hot water is supplied to the radiator 5 through the path directly leading to it from the engine cooling water outlet or the path leading to its via the heat accumulating water tank 8.

Thereafter, as the engine key switch 17 is turned off and the engine 1 is left in the outside air for hours, the cooling water in the engine 1 is cooled and its temperature is decreased to about the same temperature as the outside air. However, since the hot water is stored and kept hot in the heat accumulating water tank 8, as mentioned previously, when the engine is started next time, the heating is provided immediately and simultaneously the warming up of the engine is speeded up.

Figure 6:
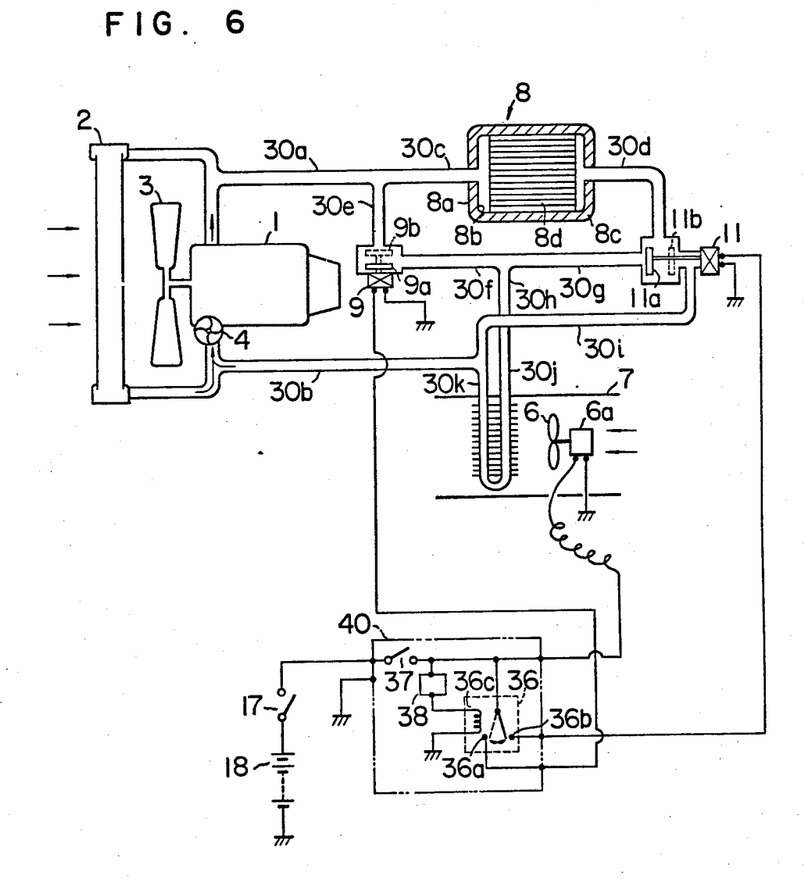
FIG. 6 is a diagram showing still another embodiment of the invention.

FIG. 6 shows still another embodiment of the invention which differs from the embodiment of FIG. 4 in that no water temperature sensor is used and that the control circuit 40 includes a timer 38. While there will be some variation depending on the outside air temperation, the time required for warming up the engine or the time for using up the hot water in the heat accumulating water tank 8 is known beforehand and such time is preset into the timer 38. Thus, the timer 38 interrupts the flow of the current from the power source 18 to the coil 36c of the relay 36 until the preset time expires, so that the contact 36b is energized and the contact 36a is deenergized. As a result, in the like manner as the embodiment of FIG. 4, the electromagnetic selector valve 11 is energized and the electromagnetic on-off valve 9 is deenergized, thus connecting the heat accumulating water tank 8 and the radiator 5 in series. When the preset time of the timer 38 expires, the current flows to the coil 36c of the relay 36 so that the contact 36a is energized and the contact 36b is deenergized. Thus, the heat accumulating water tank 8 and the radiator 5 are connected in parallel.

In accordance with the present embodiment, as mentioned previously, there are provided the water passage which connects the radiator 5 and the heat accumulating water tank 8 in series between the engine cooling water outlet and inlet and the water passage which connects the radiator 5 and the heat accumulating water tank 8 in parallel and the water temperatures at the inlet and the outlet of the heat accumulating water tank 8 are sensed, whereby the electromagnetic valves for opening and closing the water passages are controlled in such a manner that the radiator 5 and the heat accumulating water tank 8 are connected in series during the period prior to the completion of the engine warming up and that the radiator 5 and the heat accumulating water tank 8 are connected in parallel after the completion of the engine warming up. As a result, even during the period just after the starting of the engine under winter conditions the desired heating effect is ensured by virtue of the hot water from the heat accumulating water tank 8 and also the warming up time is reduced thus reducing the consumption of fuel due to a prolonged warm up operation on an over-rich mixture. The pipe lines and the electromagnetic valves which are provided for the cooling water passages are also simple as compared with the prior art heating systems of the type including a radiator and a heat accumulating water tank. Moreover there is no need to use any specially designed cooling water pumps, etc. Thus, despite its relatively simple construction and low cost, the system of this embodiment is capable of performing both the heating and warm up functions which present problems when starting the engine under cold weather conditions.

Figure 7:
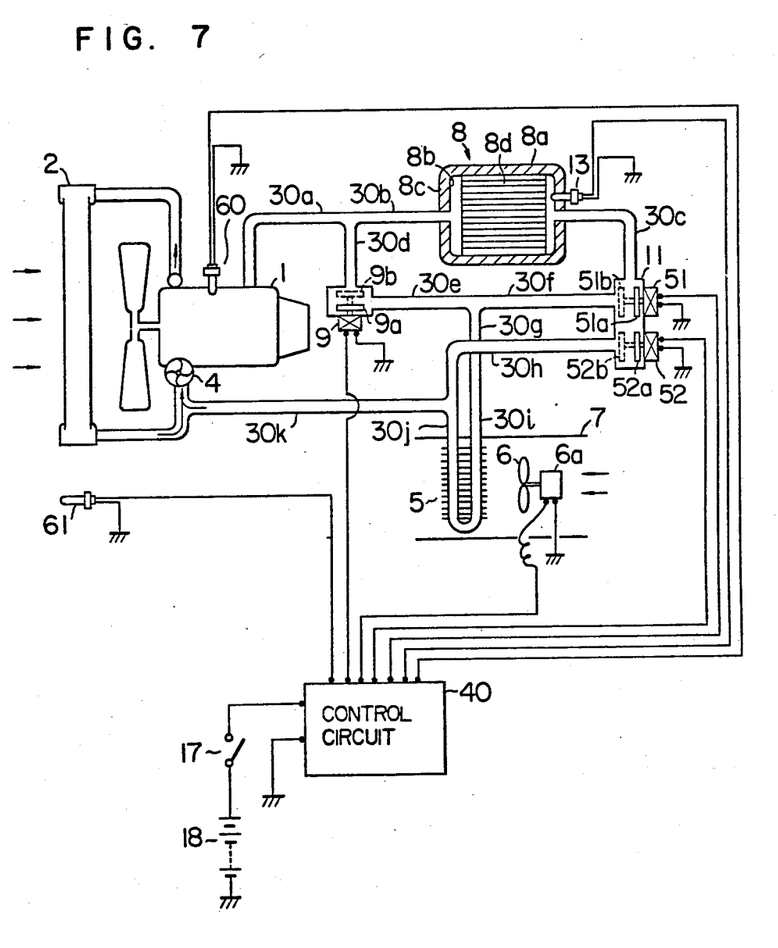
FIG. 7 is a diagram showing still another embodiment of the invention.
Figure 8:
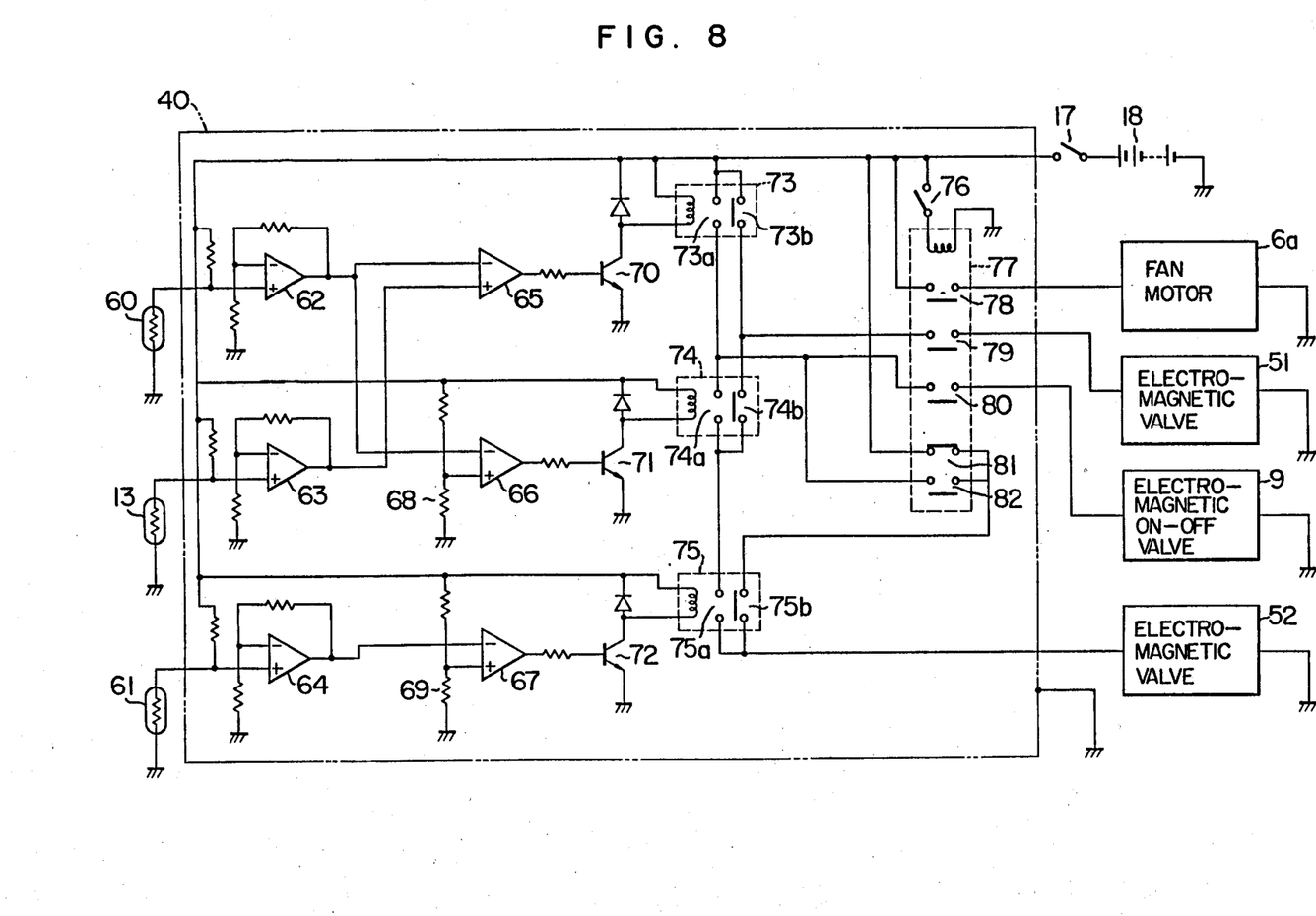
FIG. 8 is a circuit diagram of the control circuit shown in FIG. 7.

FIGS. 7 and 8 show still another embodiment of the invention which differs from the embodiment of FIG. 4 in that the inflow water temperature sensor 31 at the inlet of the heat accumulating water tank 8 is eliminated and there are provided an engine water temperature sensor 60 and an outside air temperature sensor 61. Also, the electromagnetic valve 11 is an electromagnetic on-off valve of a twin type comprising electromagnetic valves 51 and 52. The valves 51 and 52 are respectively associated with the branch pipe lines 30f and 30h and are operated in such a manner that one of the pipe lines is opened and the other pipe line is closed or both of the pipe lines are opened or closed.

The engine water temperature sensor 60 comprising a thermistor or the like for sensing the cooling water temperature within the engine 1, the heat accumulating water tank water temperature sensor 13 comprising a thermistor or the like for sensing the water temperature within the heat accumulating water tank 8 and the outside air temperature sensor 61 comprising a thermistor or the like for sensing the outside air temperature, send their sensed temperature signals to the control circuit 40 which controls the electromagnetic on-off valve 9 and the twin electromagnetic on-off valve 11.

FIG. 8 is a circuit diagram of the control circuit 40 comprising amplifiers 62, 63 and 64 for respectively amplifying the detection signals from the engine water temperature sensor 60, the heat accumulating water tank water temperature sensor 13 and the outside air temperature sensor 61, comparators 65, 66 and 67 for comparing the amplified signals with one another or with predetermined reference values and transistors 70, 71 and 72 which are respectively turned on and off in response to the output of the comparators 65, 66 and 67. The control circuit 40 also comprises electromagnetic relays 73, 74 and 75 which are respectively controlled by the turning on and off of the transistors 70, 71 and 72 so as to selectively operate the fan motor 6a, the electromagnetic on-off valve 9 and the first and second valves 51 and 52 of the twin-type electromagnetic on-off valve 11 through a 5-contact electromagnetic relay 77 which is operated in response to the turning on and off of a heating switch 76.

The operation of this embodiment will now be described with reference to FIGS. 7 and 8. Under winter weather conditions where the heating is required, when the engine key switch 17 is closed, the engine 1 is started and simultaneously the power is supplied to the control circuit 40. Then, the heating switch 76 (FIG. 8) is closed. At this time, the heat accumulating water tank 8 is storing the high-temperature cooling water heated by the preceding engine operation (e.g., immediately after the stopping of the preceding engine operation the hot water of 80° C. was stored such that its temperature is maintained as high as about 70° C. even after 24 hours). Also, during the period just after the starting of the engine the temperature of the cooling water in the engine and the pipe lines is low. As a result, the engine water temperature sensor 60 senses the low temperature and the heat accumulating water tank water temperature sensor 13 senses the high temperature. These detection signals are respectively amplified by the amplifiers 62 and 63 (FIG. 8) and then applied to the first and second inputs of the comparator 65 (the amplifiers 62 and 63 have the same amplification characteristics and generate the same signal voltage when they sense the same temperature). The thermistors have a negative resistance-temperature characteristic and they each apply to the comparator 65 a signal voltage which increases with a decrease in the water temperature. The comparator 65 compares the first and second inputs so that a "1" is generated when the first signal voltage is lower than the second signal voltage and a "0" is generated when the reverse is the case. In this case, since the signal voltage from the thermistor 60 is higher than the signal voltage from the thermistor 13, the comparator 65 generates a "0" and thus the transistor 70 is turned off. The detection signal of the engine water temperature sensor 60 is first amplified by the amplifier 62 and then applied to the comparator 66 which in turn compares the signal with the reference voltage produced by a resistor 68 (the reference voltage is set to 90° C., for example). As a result, the transistor 71 is turned off when the engine cooling water temperature is lower than 90° C. and it is turned on when the reverse is the case. The detection signal of the outside air temperature sensor 61 is first amplified by the amplifier 64 and it is then compared by the comparator 67 with the reference voltage produced by a resistor 69 (the reference voltage is preset to 25° C., for example). Thus, the transistor 72 is turned off when the outside air temperature is lower than 25° C. and it is turned on when the reverse is the case. Assuming now that under the normal conditions the engine cooling water temperature is lower than 90° C. and the outside air temperature is lower than 25° C. (the actual temperature is much lower due to the winter weather conditions), the transistors 70, 71 and 72 are all turned off. As a result, the electromagnetic relays 73, 74 and 75 adapted to be energized by the turning on of these transistors are all deenergized and consequently their contacts 73b, 74b and 75b are turned on. The 5-contact electromagnetic relay 77 is so designed that when the heating switch 76 is closed, its normally open contacts 78, 79, 80 and 82 are turned on and a normally closed contact 81 is turned off. As a result, the fan motor 6a is energized by the power source 18 via the closed contact 78 and it comes into operation. On the other hand, since the contact 80 is turned on but the contact 73a of the electromagnetic relay 73 is turned off, the electromagnetic on-off valve 9 is not energized and it is held at the position 9b, thus closing the cooling water passage leading to the radiator 5. Since the contact 79 is turned on and the contact 73b of the electromagnetic relay 73 is turned on, the current flows from the power source 18 to the first valve 51 of the twin electromagnetic on-off valve 11 and energizes it, thus moving it to its position 51a and thereby opening the pipe lines 30c and 30f leading from the heat accumulating water tank 8 to the radiator 5. On the other hand, although the contact 75b of the electromagnetic relay 75 is turned on and the normally open contact 82 is turned on, the contact 73a of the electromagnetic relay 73 is turned off so that the second valve 52 is deenergized and thus it is held at its position 52b. Thus, the water passage leading from the heat accumulating water tank 8 to the pipe line 30h via the pipe line 30c is closed. As a result, the engine cooling water pump 4 supplies the low-temperature cooling water under pressure from the cooling water outlet (the pipe line 30a) into the heat accumulating water tank 8 via the line 30b. Due to the mixing preventive device 8d, the high-temperature hot water stored in the heat accumulating water tank 8 is practically prevented from mixing with the entering low-temperature cooling water but is force out and introduced into the radiator 5 via the pipe line 30c, the first valve 51 of the twin electromagnetic on-off valve 11 and the pipe lines 30f, 30g and 30i. Since the motor 6a has been operated and the fan 6 has been in operation in response to the closing of the heating switch 76, the heat exchange takes place in the radiator 5 and the hot air is supplied into the interior of the vehicle compartment. In other words, the interior heating is provided as soon as the engine is started.

The hot water which is kept hot in the heat accumulating water tank 8 at a temperature of about 70° C., for example, is closed to about 50° C. by the heat exchange and then the cooled air is returned into the engine 1 via the radiator 5 and the pipe lines 30j and 30k and through the water pump 4. Since the temperature of the cooling water in the engine is about the same with the outside air temperature during the period just following the start of the engine, if the hot water of 50° C. is supplied under winter conditions, the temperature of the engine cooling water will rise in a short period of time and the warming up of the engine will be completed in several minutes, thus considerably reducing the time required for warming up the engine.

By about that time, the hot water within the heat accumulating water tank 8 is used up and the cold water introduced just after the start of the engine now reaches the outlet of the heat accumulating water tank 8. On the other hand, the cooling water which was raised in temperature during the warming up operation of the engine 1 now reaches near the inlet of the heat accumulating water tank 8. As a result, the engine water temperature sensor 60 senses the high temperature and the heat accumulating water tank water temperature sensor 13 senses the low temperature. When this occurs, the output of the comparator 65 of the control circuit 40 goes to "1" so that the transistor 70 is turned on and the current flows to the coil of the electromagnetic relay 73. Thus, the contact 73a is turned on and the contact 73b is turned off. In this case, since the engine cooling water temperature is unchanged or below the preset value of 90° C. and the outside air temperature is unchanged or below 25° C., the outputs of the transistors 71 and 72 remain unchanged and thus the contacts 74b and 75b of the electromagnetic relays 74 and 75 remain on. As a result, while the electromagnetic on-off valve 9 is energized through the closed contact 80 and the closed contact 73a of the electromagnetic relay 73, the first valve 51 of the twin electromagnetic on-off valve 11 is deenergized since the contact 73b of the electromagnetic relay 73 is now off although the contact 79 remains on and the second valve 52 is energized since the contact 73a of the electromagnetic relay 73 is now on although the contact 75b and the contact 80 remain on. As a result of the energization of the electromagnetic on-off valve 9, its valve member is moved to the position 9a thus opening the water passage leading from the pipe line 30d to the pipe line 30e, and the deenergization of the first valve 51 of the twin electromagnetic on-off valve 11 moves its valve member to the position 51b thus closing the water passage leading from the pipe line 30c to the branch line 30f. Simultaneously, the energization of the second valve 52 moves its valve member to its position 52a and the water passage leading from the pipe line 30c to the other branch line 30h is opened. As a result, the hot water delivered under pressure from the engine 1 is supplied to the radiator 5 via the pipe lines 30a and 30d, the electromagnetic on-off valve 9 and the pipe lines 30e, 30g and 30i so that the hot water serves the heating function and then is returned to the engine 1 via the pipe lines 30j and 30k. Also, the hot water delivered under pressure from the engine 1 is supplied to the heat accumulating water tank 8 via the pipe lines 30a and 30b so that the cold water is forced out and returned to the engine 1 via the pipe line 30c, the second valve 52 of the twin electromagnetic on-off valve 11 and the pipe line 30h. As a result, the cold water in the heat accumulating water tank 8 is gradually replaced with the hot water so that after a short time the tank 8 is filled with the high-temperature hot water (e.g., 80° C.) and preparations for the next engine starting are completed. In this case, when these conditions are attained so that both the cooling water within the engine 1 and the cooling water within the heat accumulating water tank 8 are replaced with the high-temperature hot water (e.g., 80° C.), there is the possibility of a situation arising in which slight changes in temperature between the two causes the engine water temperature sensor 60 to repeatedly sense the lower temperature or the higher temperature than the heat accumulating water tank water temperature sensor 13. In these conditions, however, the same result from the standpoint of giving full play to the heating efficiency will be obtained and no trouble will be caused even if the hot water is supplied to the radiator 5 via the path directly leading to it from the engine cooling water outlet or the path which passes through the heat accumulating water tank 8.

Thereafter, as the engine key switch 17 is turned off and the engine 1 is left in the outside air for hours, the engine cooling water is cooled and its temperature drops to about the same temperature as the outside air. However, due to the hot water kept hot within the heat accumulating water tank 8, when the engine is started next time, the interior heating is effected immediately and also the engine warming up is speeded up.

The operation of the embodiment will now be described with reference to a case where the season is spring or autumn with the outside air temperature being below 25° C. but requiring no heating and the engine cooling water temperature is normal or below 90° C. with no danger of overheating the engine. Firstly, the engine key switch 17 is closed and the engine is started. The heating switch 76 is off. During the period just after the start of the engine, the engine water temperature sensor 60 senses the low temperature and the heat accumulating water tank water temperature sensor 13 senses the high temperature thus turning the transistor 70 off. Also, since the engine cooling water temperature is below the preset temperatures of 90° C. and the outside air temperature is also below the preset value of 25° C., the transistors 71 and 72 are turned off. As a result, the contacts 73b, 74b and 75b of the electromagnetic relays 73, 74 and 75 are all turned on. In the 5-contact relay 77 adapted to be operated by the closing of the heating switch 76, the normally open contacts 78, 79, 80 and 82 remain off and the normally closed contact 81 remains on. Thus, the fan motor 6a is out of operation and the electromagnetic on-off valve 9 is not energized thus closing the water passage. The first valve 51 of the twin electromagnetic on-off valve 11 is deenergized and the second valve 52 is energized and opened by the closing of the contacts 75b and 81 thus opening the water passage passing through the heat accumulating water tank 8 alone. It should be noted that when the heating switch 76 is off, the normally open contacts 79 and 80 operable in response to the operation of the switch 76 are off so that the electromagnetic on-off valve 9 and the first valve 51 are always deenergized irrespective of which one of the engine cooling water temperature and the heat accumulating water tank water temperature is higher or lower than the other. As a result, during the period immediately following the start of the engine, the cold cooling water delivered under pressure from the engine is introduced into the heat accumulating water tank 8 so that the high-temperature hot water is supplied into the engine and the warming up of the engine is speeded up thus reducing the warming up time. When the warming up is completed so that the engine water temperature sensor 60 senses a higher temperature than the heat accumulating water tank water temperature sensor 13, as mentioned previously, the positions of the electromagnetic on-off valve 9 and the first and second valves 51 and 52 of the twin electromagnetic on-off valve 11 remain unchanged so that only the heat accumulating water tank 8 is connected to the engine 1 and the hot water delivered under pressure from the engine 1 replaces the cold water within the heat accumulating water tank 8. Thus, after a short time the heat accumulating water tank 8 is filled with the high-temperature hot water and is prepared for the next engine starting.

On the other hand, under summer conditions no heating is required so that the heating switch 76 is off and the outside air temperature is higher than 25° C. The operation of the system in the normal condition where the engine cooling water temperature is below 90° C. will be described first. When the heating switch 76 is off, the electromagnetic on-off valve 9 and the first valve 51 of the twin electromagnetic on-off valve 11 are always deenergized and the associated water passages are closed as mentioned previously. As a result, no situation arises in which the radiator 5 and the heat accumulating water tank 8 are connected in series or only the radiator 5 is connected with the engine 1, and there are two possibilities, that is, depending on whether the engine cooling water temperature is lower or higher than the heat accumulating water tank water temperature the heat accumulating water tank 8 alone is connected or the heat accumulating water tank 8 too is disconnected with the engine 1. More specifically, the outside air temperature is higher than 25° C. so that the contact 75a of the electromagnetic relay 75 is turned on, and the engine cooling water temperature is lower than the preset value or 90° C. so that the contact 74a is turned on. As a result, if the engine cooling water temperature is lower than the heat accumulating water tank water temperature, the contact 73b is turned on and the second valve 52 of the twin electromagnetic on-off valve 11 is energized and opened. As a result, the heat accumulating water tank 8 alone is connected to the engine 1 thus performing the action of promoting the warming up and allowing the engine cooling water to circulate through and lower the temperature of the water within the heat accumulating water tank 8 so long as the engine cooling water temperature is lower than the heat accumulating water tank water temperature. When the engine cooling water temperature becomes higher than the heat accumulating water tank water temperature, the second valve 52 is deenergized so that the water passage leading to the heat accumulating water tank 8 is closed and the temperature of the water within the heat accumulating water tank 8 is maintained low. In other words, the heat accumulating water tank 8 retains the cooling water of about the same temperature as the outside air temperature.

Assuming now that the engine cooling water temperature exceeds 90° C. and an overheating engine condition occurs, the contact 74a of the electromagnetic, relay 74 is turned on. Also, the engine cooling water temperature becomes higher than the heat accumulating water tank water temperature so that the contact 73a of the electromagnetic relay 73 is turned on and the second valve 52 of the twin electromagnetic on-off valve 11 is energized thus opening the associated water passage. As a result, the cold water stored at about the outside air temperature within the heat accumulating water tank 8 is supplied into the engine thus effectively preventing further progress of the overheating engine condition. When the overheating engine condition is eliminated so that the engine cooling water temperature becomes lower than 90° C., the second valve 52 is closed and the cooling water from the engine is no longer circulated into the heat accumulating water tank 8. As a result, the water temperature gradually decreases until it becomes equal to the outside air temperature and the heat accumulating water tank 8 retains the cold water of the temperature of the outside air, thus preparing it for the next occurrence of overheating engine condition.

It will be seen from the foregoing that in accordance with this embodiment, the series and parallel cooling water passages passing through the radiator and the heat accumulating water tank are selectively opened and closed in accordance with the sensed temperatures of the engine cooling water temperature, the heat accumulating water tank water temperature and the outside air temperature and the on and off conditions of the heating switch, whereby effectively providing the heating and warming up during the period immediately following the starting of the engine under winter conditions and also effectively coping with engine overheating conditions under summer conditions. Another advantage is that a multi-function hot-water heating system is provided which requires no special water pump, uses relatively simple equipment such as pipe lines, electromagnetic valves, etc., and is inexpensive as compared with prior art heating systems.

What is claimed is:

1. A heating system for automobiles utilizing cooling water of an engine as a heat source, said engine having an inlet and an outlet for the cooling water, said heating system comprising:

a heating radiator associated with a fan and a motor to blow air through said heating radiator;

a heat accumulating water tank for storing hot cooling water and retaining heat thereof, said heat accumulating water tank having a mixing preventing device for preventing cold cooling water flowing into said heat accumulating water tank from mixing with the hot cooling water contained therein;

a first pipe line having an inlet and outlet pipe lines for connecting said heating radiator between the inlet and the outlet for the cooling water of the engine;

a second pipe line having an inlet and outlet pipe lines for connecting said heat accumulating water tank between the inlet and the outlet for the cooling water of the engine;

a third pipe line provided between said heating radiator and said heat accumulating water tank a first valve to open and close the inlet pipe line of said first pipe line; and a second valve to open and close the outlet pipe line of said second pipe line and to open and close said third pipe line; and wherein by opening the inlet pipe line of said first pipe line by said first valve, and by opening the outlet pipe line of said second pipe line and closing said third pipe line by said second valve, said first pipe line and said second pipe line are both opened thereby to connect said heating radiator and said heat accumulating water tank in parallel with each other with respect to the engine, and by closing the inlet pipe line of said first pipe line by said first valve, and by closing the outlet pipe line of said second pipe line and opening said third pipe line by said second valve, said heating radiator and said heat accumulating water tank are connected in series with each other with respect to the engine through the inlet pipe line of said second pipe line, said third pipe line and the outlet pipe line of said first pipe line, said system further comprising, an outflow temperature sensor positioned at an outlet of said heat accumulating water tank for sensing a temperature of the cooling water outflowing from said water tank, an inflow temperature sensor positioned at an inlet of said heat accumulating water tank for sensing a temperature of the cooling water supplied from the engine to said water tank, and a control circuit for controlling said first and second valves in response to signals from said outflow and inflow temperature sensors, such that when said inflow temperature sensor senses a low temperature and said outflow temperature sensor senses a high temperature, said first and second valves are controlled to connect said heating radiator and said heat accumulating water tank in series between the inlet and outlet for the cooling water of the engine thereby to allow the cooling water of a low temperature to flow from the engine into said heat accumulating water tank to push out the hot water contained therein to flow into said heating radiator to radiate the heat and then to return to the engine, and when said outflow temperature sensor senses a low temperature due to consumption of the hot water and replacement by cold cooling water from the engine, and when said inflow temperature sensor senses a high temperature due to warming up of the engine, said first and second valves are controlled to connect said heating radiator and said heat accumulating water tank in parallel with each other between the inlet and outlet of the cooling water of the engine.

2. A heating system of automobiles utilizing cooling water of an engine as a heat source, said engine having an inlet and an outlet for the cooling water, said heating system comprising:

a heating radiator associated with a fan and a motor to blow air through said heating radiator;

a heat accumulating water tank for storing hot cooling water and retaining heat thereof, said heat accumulating water tank having a mixing preventing device for preventing cold cooling water flowing into said heat accumulating water tank from mixing with the hot cooling water contained therein;

a first pipe line having an inlet and outlet pipe lines for connecting said heating radiator between the inlet and the outlet for the cooling water of the engine;

a second pipe line having an inlet and outlet pipe lines for connecting said heat accumulating water tank between the inlet and the outlet for the cooling water of the engine;

a third pipe line provided between said heating radiator and said heat accumulating water tank a first valve to open and close the inlet pipe line of said first pipe line; and a second valve to open and close the outlet pipe line of said second pipe line and to open and close said third pipe line; and wherein by opening the inlet pipe line of said first pipe line by said first valve, and by opening the outlet pipe line of said second pipe line and closing said third pipe line by said second valve, said first pipe line and said second pipe line are both opened thereby to connect said heating radiator and said heat accumulating water tank in parallel with each other with respect to the engine, and by closing the inlet pipe line of said first pipe line by said first valve, and by closing the outlet pipe line of said second pipe line and opening said third pipe line by said second valve, said heating radiator and said heat accumulating water tank are connected in series with each other with respect to the engine through the inlet pipe line of said second pipe line, said third pipe line and the outlet pipe line of said first pipe line, said system further comprising, a control circuit for controlling said first and second valves, said control circuit having a timer to set a predetermined time length, wherein said first and second valves are controlled to connect said heating radiator and said heat accumulating water tank in series between the inlet and the outlet for the cooling water of the engine from the start of the engine until the predetermined time length lapses and then connects said heating radiator and said heat accumulating water tank in parallel with each other between the inlet and outlet of the cooling water of the engine.

* * * * *